United States Patent [19]

Roos et al.

[11] Patent Number: 4,646,661
[45] Date of Patent: Mar. 3, 1987

[54] COMBUSTION FURNACE

[75] Inventors: Johann Roos, Meerbusch; Hans F. Flender, Neuss, both of Fed. Rep. of Germany

[73] Assignee: Udo Roos, Meerbusch, Fed. Rep. of Germany

[21] Appl. No.: 769,984

[22] PCT Filed: Dec. 21, 1984

[86] PCT No.: PCT/DE84/00281

§ 371 Date: Aug. 22, 1985

§ 102(e) Date: Aug. 22, 1985

[87] PCT Pub. No.: WO85/02898

PCT Pub. Date: Jul. 4, 1985

[30] Foreign Application Priority Data

Dec. 24, 1983 [DE] Fed. Rep. of Germany ....... 3347056

[51] Int. Cl.[4] ............... F23G 5/00; F23G 7/00
[52] U.S. Cl. .................... 110/245; 110/263; 110/347; 431/170
[58] Field of Search ............ 110/245, 347, 263, 191; 122/4 D; 431/7, 170; 34/57 C

[56] References Cited

U.S. PATENT DOCUMENTS

| 3,939,782 | 2/1976 | Albrecht | 34/57 C X |
| 4,258,005 | 3/1981 | Ito et al. | 110/245 X |
| 4,505,230 | 3/1985 | Caplin | 122/4 D |
| 4,546,709 | 10/1985 | Astrom | 122/4 D X |

FOREIGN PATENT DOCUMENTS 611090 6/1978 U.S.S.R. .............. 34/57 C

Primary Examiner—Edward G. Favors
Attorney, Agent, or Firm—Becker & Becker, Inc.

[57] ABSTRACT

Industrial furnace for the combustion of solid, liquid, pasty or gaseous fuels, including at least two fluidized beds through which hot gas passes from the bottom, and which are offset in height in the transport direction of the fuel into the combustion chamber according to a reciprocal delimitation one behind the other and in step, after adjusting a mean combustion temperature between preferably 500° and 800° C. It is further possible to recover from household refuse, and/or industrial refuse similar to household refuse, a fraction of fuel rich in energy and low in noxious products by preparation via drum screens, hammer mills, and sliding plate and rod screens of a particulate size between 120 and 500 mm.

12 Claims, 6 Drawing Figures

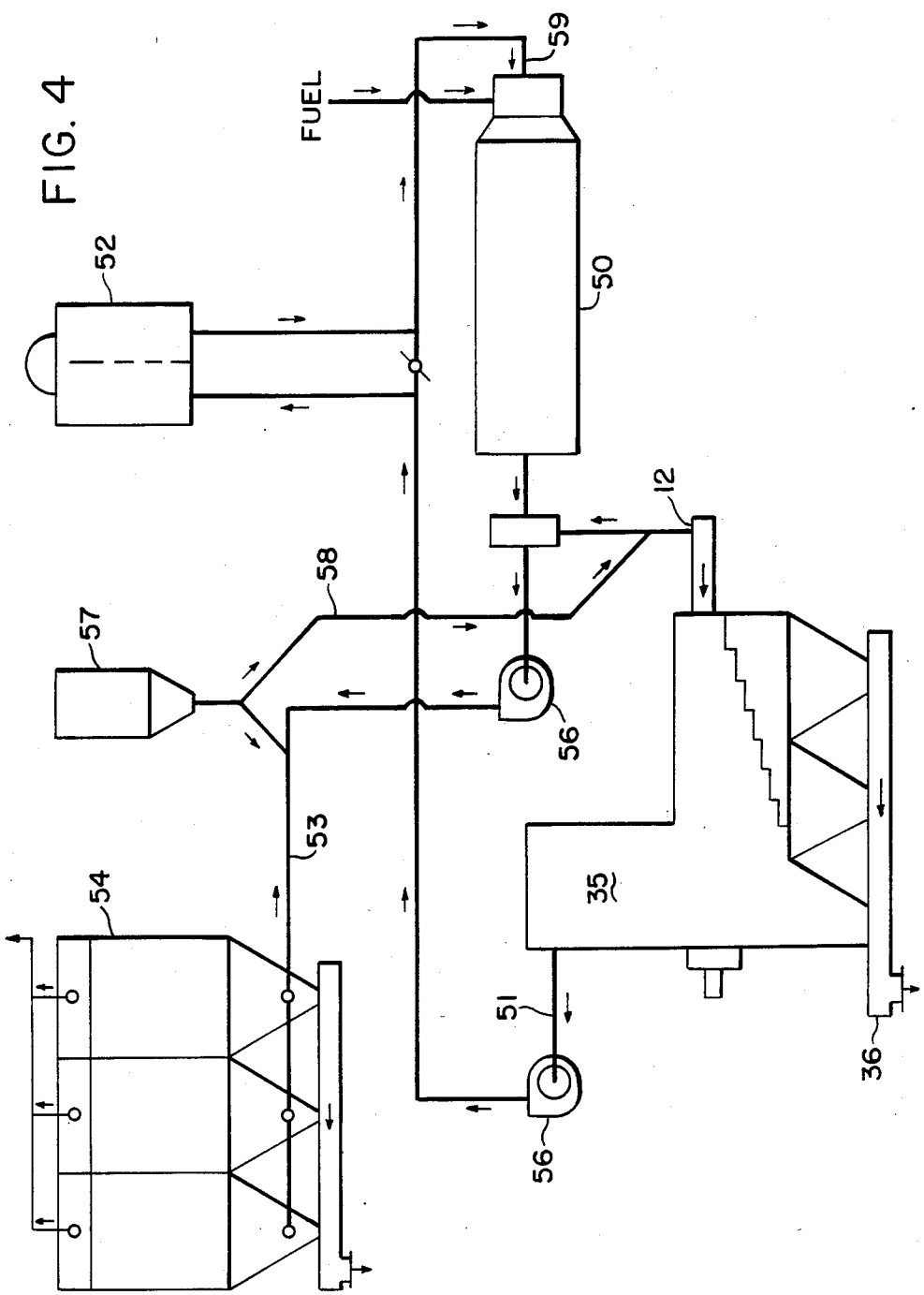

1

COMBUSTION FURNACE

FIELD OF THE INVENTION

The present invention relates to an industrial furnace for the combustion of solid, liquid, pasty, or gaseous fuel, with the furnace having a fuel inlet, and gas and ash outlet means. The present invention also relates to a method of producing a combustible fuel, which is rich in energy and low in noxious material, by treating household refuse, and/or industrial refuse which is similar to household refuse, with size-reduction, screening, and withdrawal apparatus, including magnet screens, for the selective recovering of various refuse constituents, especially paper.

DESCRIPTION OF THE ART

With regard to the industrial furnace as the subject matter of the present invention, the most economical and environmentally-favorable solution of the various furnace systems in the state of the art has proven to be the fluidized bed furnace, which is especially used for the combustion of complicated refuse, and fulfills in particular the environmental requirements to the extent that significantly lower quantities of noxious materials are emitted than with conventional furnaces.

With fluidized bed furnaces, the combustion air is conveyed through a combustion chamber bottom which is equipped with air nozzles. Located on this bottom is a layer comprised of fine-grained inert material. The layer is swirled by the air stream which is conveyed through from below, whereby for the initiation of the combustion process the layer is heated to the ignition temperature of the respective fuel. For this purpose, a starter burner operated with oil or gas is generally used.

Immersion heating surfaces are frequently placed in the fluidized bed, and assume the task of cooling the fluidized bed to the desired combustion temperature.

After the ignition temperature has been achieved, the respective fuel is introduced into the fluidized bed. During combustion of the respective fuel, the granule size is continuously being reduced, so that the individual fuel particles become lighter, until the remaining ash particles are picked up by the rising gas stream and are carried off.

However, the heretofore known fluidized bed furnace has critical drawbacks. On the one hand, due to the circulating fine sand, nearly all of the inner surfaces of the respective combustion chamber have erosion problems due to the so-called "sandblast effect". Considerable wear occurs especially on the immersion heating surfaces and on the lining of the combustion chamber, as a result of which the likelihood of repair for the overall combustion unit is negatively impacted. Furthermore, the degree of combustion of the respective fuel is frequently insufficient, so that considerable effort must be undertaken with regard to cleaning the flue gas. Since in addition to the use of generally conventional fuels, fuel produced from household refuse and/or industrial refuse which is similar to household refuse is also supposed to be used in such furnaces utilizing fluidized beds, there exists the further problem of making available combustible fuel which is rich in energy and low in noxious materials, and is produced from such refuse. Methods for preparing household refuse and/or industrial refuse which is similar to household refuse are known, for example, from U.S. Pat. No. 4,187,775 and German Offenlegungsschrift No. 30 37 714.

With regard to the production of fuel from refuse, German Pat. No. 31 28 560 discloses a method for treating the combustible fraction of size-reduced household refuse for producing so-called fuel pellets in a briquette press; this fraction has been freed of dense-medium material, and to the extent possible has been dried to a residual moisture content of 8 to 10%. In this manner, it is possible, without adding binders, to produce briquettes which have a relatively high heating value, and are stable during transport and storage.

However, for the following reasons the production of pellets will be of secondary importance for future furnace concepts: mechanical expenditure and energy requirements for the compacting of the pellets in the grinding pan, accompanied by simultaneous high wear of the machine parts; energy consumption for drying the pellets; and high cost for preliminarily reducing the size of the pellets prior to the combustion. Furthermore, with the heretofore methods it is not possible to efficiently separate off noxious material with respect to the combustion process and its exhaust gases. A consequence hereof is that during the production of the fuel pellets from refuse, the quality with regard to the heating value relative to the quantitative refuse throughput is unmistakably in the forefront.

In order to produce pellets, it is furthermore necessary that the starting materials have a certain moisture content, so that the individual solid particles can agglomerate. Additional binders may have to be used. The minimum moisture is introduced either directly by the appropriate refuse constituents, or must be obtained by the external supply of water or by additional drying.

Furthermore, a plurality of pelletizing units are required, since pursuant to the state of the art of known units, only a relatively low throughput is possible. However, in a refuse treatment plant, a considerable amount of refuse, and hence a considerable amount of fuel, is handled. The present invention is also intended to provide assistance in this area.

SUMMARY OF THE INVENTION

An object of the present invention therefore initially is to provide a combustion furnace for the combustion of a solid, liquid, pasty, or gaseous fuel, according to which it is possible to have exact temperature control, and to avoid erosion problems to a great extent, with the inventive furnace having a favorable efficiency, and making it possible to achieve as complete a combustion as possible.

The industrial furnace inventively provided to realize this object is characterized by at least two fluidized beds through which hot gas flows from below, and which in the direction of transport of the fuel in the furnace are disposed one after the other and are offset in height; an average combustion temperature is set between 500° and 900° C., preferably between 500° and 800° C., whereby the temperature setting is determined by the possibility of binding the noxious materials contained in the fuel with lime. Whereas with the combustion temperatures of over 1100° C. customary with the heretofore known furnaces the noxious materials exist only in ionized form, with the inventively provided temperatures sulfur and sulfur metals can be bound in lime, and chlorine and fluorine can be filtered out with textile filters.

The transport velocity of the gas which is conveyed through the fluidized beds is preferably set in such a way that even when coated with pulverous or sand-like material, these fluidized beds essentially retain their shape and arrangement.

The fluidized bed or beds preferably comprise a grate coated with an inert powder or sand. The gas introduction is then regulated in such a way that the powder or sand bed is held just below the fluidation point. Inventively, coarse-grained sand, for example with a granule size of between 3 and 10 mm, are preferably used.

The present invention has the advantage that the fluidized-bed material, especially the sand, is not swirled within the combustion chamber and is not mixed with the fuel particles; rather, due to its high specific weight relative to the fuel particles, the fluidized bed essentially has a stable shape, despite the satisfactory passage of the introduced gas, so that on the one hand the fuel particles can be conveyed through the furnace in the air stream and can be burned, and on the other hand, however, the "sand blast effect" observed in the known furnaces due to the swirling of the sand is reliably avoided.

Of course, a prerequisite for a satisfactory combustion is that the material of a fluidized bed be heated to a temperature which is the same as, or greater than, the ignition temperature of the respective fuel which is being used.

By regulating the quantity of gas conveyed through the individual fluidized beds, and its composition, especially the oxygen content, it is possible to have an optimum combustion and temperature control in the furnace.

The transport of the fuel particles along the preferably step-like offset fluidized beds is effected, for example, by nozzles or slots disposed between the connecting elements of the individual beds; combustion air can be injected at the same time via these nozzles or slots.

By respective introduction of hot gas or air, the temperature in the furnace can also be readily controlled. High temperatures, for example over 1200° C. as achieved when burning wood or oil, are not desired, because salts are contained in refuse, and these salts melt at such temperatures and obstruct the fluidized beds.

A temperature reduction to temperatures below 900° C., and preferably below 800° C., are inventively effected to the extent that the combustion temperatures achieved by great excess of air are compensated for by mixing low temperature hot gases with the fresh air.

At the same time, mixing the combustion air with hot gases which have been burned once already enables a repeated combustion of noxious materials, such as CO residue, which possibly remains in the hot gas.

By using coarse-grained powder or sand of inert material in the fluidized bed, in addition to avoiding swirling of the latter, and wear within the interior of the furnace, a further advantage is achieved, whereas in conventional fluidized bed furnaces a large proportion of the sand utilized is carried off together with the ash, and must subsequently be recovered in expensive separating processes, in an inventive combustion furnace nearly pure ash without sand constituents can be withdrawn. In addition, the complete combustion assures that the withdrawn combustion air contains relatively few harmful contaminants, which would otherwise have to be subjected to expensive and complicated filtering processes.

Nonetheless, pursuant to a further development of the present invention, there is provided a conduit which extends from the gas outlet of the furnace to a filter unit connected downstream thereof, whereby the filter unit preferably comprises one or more textile filters. These filters can, for example, be coated with lime to remove sulfur from the flue gases, so that a calcium sulfate product is precipitated. At the same time, chlorine and fluorine can be bound.

It would also be possible to bind sulfur in the combustion chamber itself by adding lime to the fluidized beds. The inventive combustion furnace is advantageously suited for a number of fuels. In the publication "VDI Reports" of Sept. 2, 1983, the combustion of clarifying and refuse slurry in two separate drying and combustion stages is described. Furthermore, a granulating step is provided for facilitating handling of the slurry in the subsequent fluidized bed stages of the combustion furnace. Here also the combustion is again carried out in two separate method steps (namely with preceding drying), thus involving increased expense or apparatus. It is for just these types of fuels that the inventive combustion furnace is suitable, with which the drying and combustion of slurries from external units can be carried out.

The use of an inventive combustion furnace, especially when using a fuel produced pursuant to the inventive method, also enables further advantageous applications. For example, the hot steam withdrawn from the combustion furnace, as well as the ashes produced during the combustion, can be used for producing bricks and earth products. Examples include the production of sand-lime bricks, cement, or bricks.

A further of object of the present invention is to provide a method of treating household refuse, and/or industrial refuse which is similar to household refuse, with size-reduction, screening, and withdrawal mechanisms to produce a fuel which is rich in energy and low in noxious material, whereby the fuel as such is available for subsequent combustion without further changes of its shape or structure.

The inventive method is characterized in that, along with selective recovery of various refuse constituents, especially paper and synthetic material foils, the delivered refuse, after screening off a fraction, preferably between 180 mm and 500 mm, subsequent size reduction accompanied by simultaneous separation of adhering contaminants, especially dust, sand, etc., and magnet screening, is subjected to a second screening with which, via a multi-stage screening unit, the fraction of preferably less than 30 mm, and the fraction of preferably less than 180 mm, are removed from the material stream, with the fractions of less than 30 mm and less than 180 mm subsequently, after possibly being combined, being carried out, while the fraction greater than 180 mm, for the use as fuel, is subjected to a size reduction to preferably 30 to 50 mm, possibly with the interposition of a compaction.

As a result of the inventive combination of various screening, size-reducing, and withdrawal devices in the claimed combination, it is possible to separate a refuse fraction which, for example, comprises approximately 30 to 40% by weight synthetic material, and 60 to 70% by weight paper, whereas the provided household refuse comprises approximately 25% by weight paper, and in particular approximately 25% by weight paper and 7% by weight synthetic material. However, a particular advantage of the inventive method is that by adjusting the machine parameters, namely the free screening surface and the configuration of the hammer mill, with regard to the selective size reduction of the paper, but not of the synthetic material foils, it is possible to adjust in particular the amount of synthetic material in the synthetic material-paper mixture, and hence to change the heating value of the fuel.

For this selective concentration of the synthetic material portion, the size reduction stages, among others, are of particular significance to the extent that it is possible, especially with the aid of a hammer mill, to achieve a preliminary removal of various refuse parts, since at this stage the provided synthetic material is to a large extent not reduced in size, and permits the later isolation by means of a screening device. Furthermore, the hammer mill permits a repelling of contaminants, especially dust and other inert materials, from the paper particles which are later separated as fuel.

Of particular significance with regard to the quality of the fuel is also the second screening in the multi-stage screening unit, which is expediently embodied as a drum screen with a screen width of about 30 mm, at which inert materials can be removed, so that the ash content of the isolated fuel fraction is kept extremely low, being under 15% by weight. Conventional values with the heretofore known methods for producing fuel are about 30% by weight ash. By screening at about 30 mm, with preceding removal of the refuse parts in the hammer mill, there can be removed in particular the inert materials which are carriers of salts which are undesired during the combustion process, and furthermore the fine constituents as carriers of moisture can be removed, so that a predrying of the fuel prior to combustion is no longer absolutely necessary; finally, other contaminants can also be removed from the screen overflow, the desired synthetic-paper mixture.

With the claimed screening of various fractions, it is at the same time possible to recover in a high degree of purity other raw materials. For example, the fraction obtained when screening at less than 180 mm inventively contains practically no synthetic material (synthetic material present at less than 5% by weight), so that this fraction can be used for the known treatment process for producing paper.

As a result of the inventive concentration of the synthetic material foils in the fuel fraction, the heating value of this fraction can be increased to values of up to about 20,000 kilojoules/kilogram whereas, for example, commercial lignite has a value of approximately 14,000 kilojoules/kilogram. Household refuse in its untreated form has an average heating value of about 8,000 kilojoules/kilogram. A synthetic material-paper mixture produced pursuant to the present invention has proven to be a combustible energy carrier which is extremely rich in energy and at the same time is low in noxious material, and which after size reduction to approximately 30 to 50 mm is available without further treatment as a fuel for subsequent combustion.

A fuel produced pursuant to the inventive method also represents an advantageous energy carrier for conventional combustion furnaces, because, due to the high heating value and the low degree of contaminants, not only is an easier and more complete combustion possible, but also a lower expenditure for apparatus for scrubbing flue gas is required.

The present invention, including advantageous embodiments and further developments, can be clearly seen from the content of the patent claims, which follow this specification.

DESCRIPTION OF THE DRAWINGS

The present invention will now be described in detail with the aid of the drawings, which illustrate one exemplary embodiment. Shown are:

FIG. 4 a schematic illustration of the arrangement of various supplementary units in a combustion furnace of the type shown in FIGS. 1 and 3, FIG. 5 a sectional view through a portion of the bottom of a valve nozzle of a fluidized bed, FIG. 6 a flow diagram to illustrate the stages of one exemplary embodiment of the inventive method for producing a combustible fuel which is rich in energy and low in noxious material from household and/or industrial refuse, with subsequent combustion and binding in a sand-lime brick production process.

FIGS. 1-3 illustrate one exemplary embodiment of an inventive combustion furnace. The furnace essentially comprises: a steel jacket 10, the inner side of which is provided with a refractory lining 11; an inlet 12 for the fuel; an outlet 13 for ash which is to be withdrawn, with said outlet being disposed approximately opposite the inlet 12, yet offset therefrom in the downward direction; a plurality (8 in the illustrated embodiment) of successively arranged fluidized beds 14 which extend between the inlet 12 and the outlet 13, and are downwardly stepped from the inlet 12 to the outlet 13; a plurality (2 in the illustrated embodiment) of air-supply shafts 15; and a hot gas vent 16 in the upper, dome-like part of the furnace.

Figure 2:
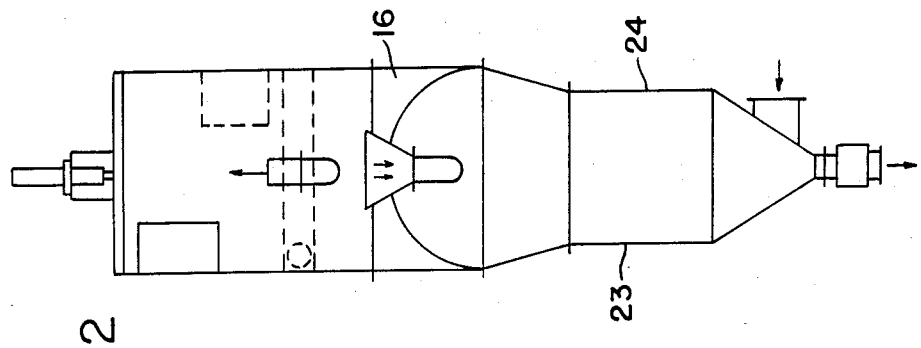
FIG. 2 a further view of the furnace of FIG. 1.
Figure 1:
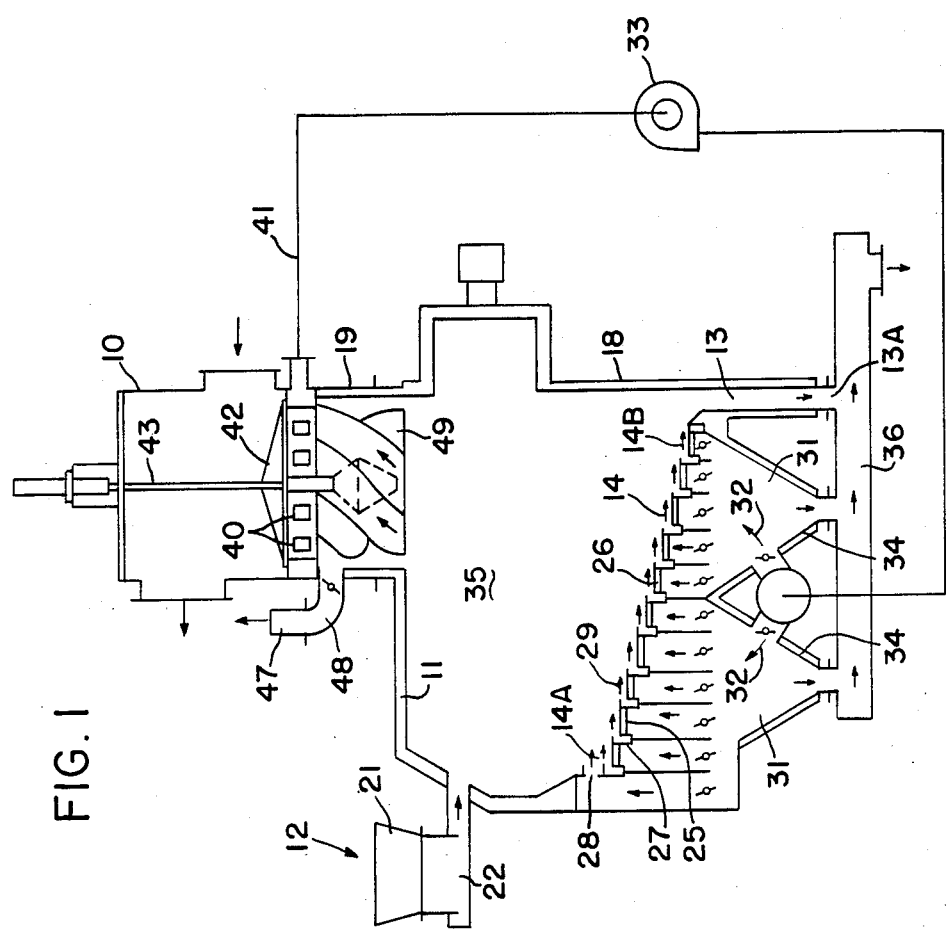
FIG. 1 an industrial furnace schematically illustrating its functional parts.
Figure 3:
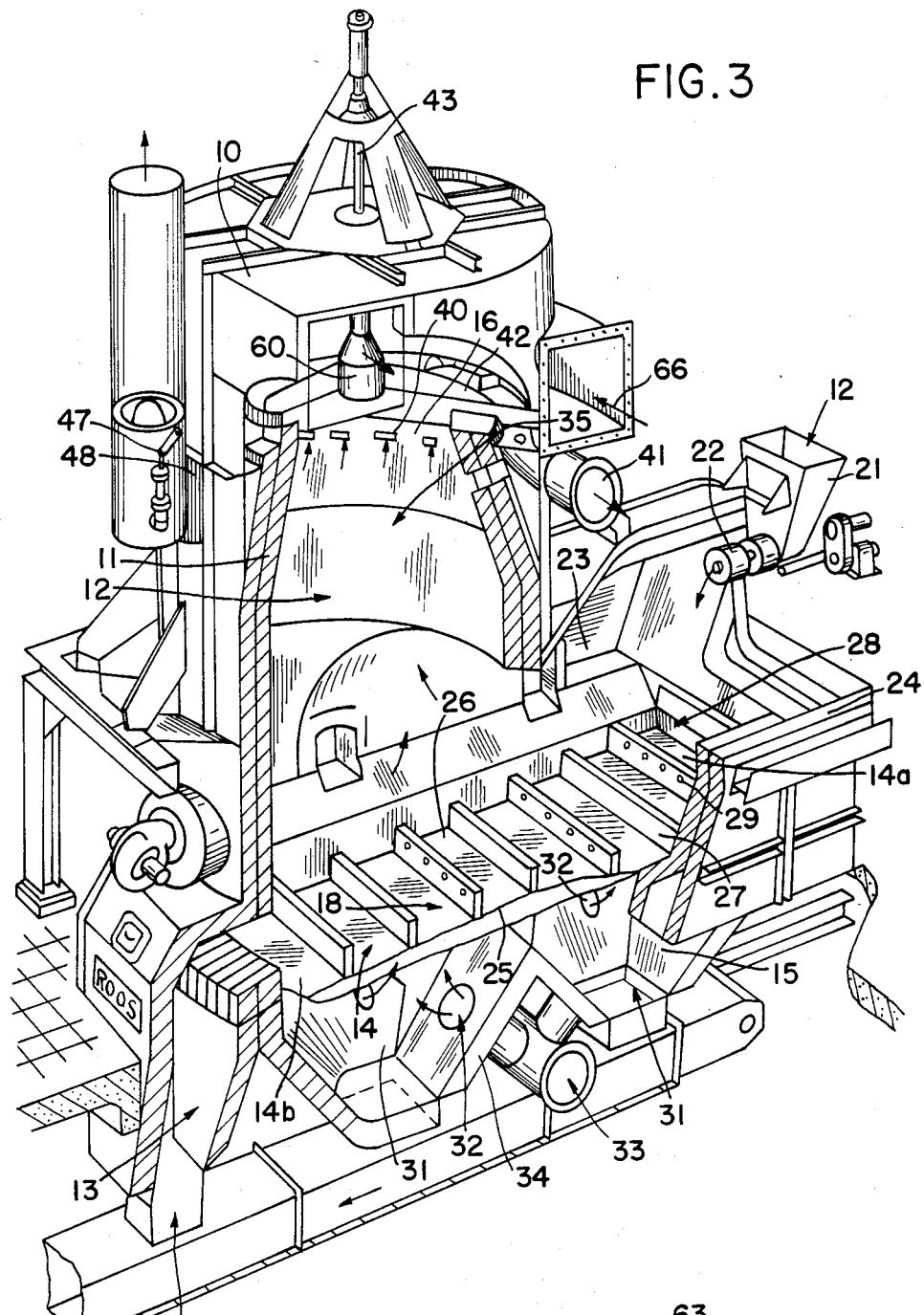
FIG. 3 a broken-away view of the inventive combustion furnace.

The basic shape of the combustion furnace in the illustrated embodiment is such that a dome-like upper part, which includes the hot gas vent 16, extends from a parallelepipedal base 18, in which the fluidized beds 14 are disposed.

The inlet 12 is disposed in the upper lateral region of the base 18, with the fuel being introduced via a hopper 21, from the bottom of which there extends into the interior of the furnace a compacting screw 22 or a similar conveying means, for example for a discontinuous or batch introduction of the fuel after it has been compacted. The screw 22 is generally used when solid or at least pasty, perhaps previously granulated, fuels are introduced. If the energy carrier is liquid or gaseous, a nozzle can be used, for example, for injection in place of the hopper 21 and the compacting screw 22.

The provision of a screw 22 is advantageous for many reasons. On the one hand, simple means are provided for achieving an absolutely reliable sealing of the furnace in the inlet region 12. On the other hand, the quantity of fuel introduced can easily be obtained by controlling the speed of the screw 22. It is particularly advantageous if the screw drive is combined with a temperature regulator in the interior of the furnace, which regulator, possibly along with the interposition of a measuring and regulating device, via the feed of the screw 22, controls the respective quantity of fuel required for maintaining a constant temperature in the furnace.

The fluidized beds 14 are offset toward the bottom and are disposed at a distance from the screw 22. In the illustrated embodiment, each bed has an essentially rectangular shape and extends between the two furnace walls 23, 24 essentially at right angles to the orientation of the screw 22. Each fluidized bed comprises a grate 25, above which is disposed a sand bed 26. The grates 25 are detachably fixed to the sidewalls 23, 24 of the furnace via appropriate brackets or supports (not illustrated); crosspieces 27 are disposed between individual grates 25. The grates 25 are downwardly offset in the manner of steps from the region of the inlet 12 to the region of the outlet 13. Each of the sand beds 26 is filled to the upper edge of that crosspiece 27 which is behind it in the direction of transport of the fuel, resulting in an overall step-like pattern of the fluidized beds 14.

Figure 5:
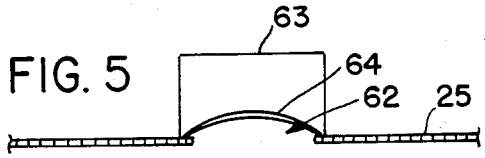

The grates 25 and the crosspieces 27 are made of metal, while the sand beds comprise quartz sand. As shown in FIG. 5, so-called valve nozzle bottoms are preferred as grates. These valve nozzle bottoms have openings 62 which can be exposed by the gases which flow in from below by raising valve covers 64 which are movable along guides 63. Also suitable in place of the quartz sand is any other inert material, for example ground, fireproof clay. The sand should have a specific weight which is greater than that of the energy carrier which is to be burned. In addition, the sand should be relatively large-grained, preferably having an average granule size of between 1 and 3 mm. Taken as a whole, the sand and the valves of the nozzle bottom must be coordinated with one another in such a way that an optimum passage of hot gas from below is assured.

Pursuant to an alternative embodiment of the invention, in place of a valve bottom having a sand bed disposed thereabove, a one-piece, air-permeable bed, for example an open-pore ceramic material, can be used. Extending between the inlet 12 and the fluidized bed 14A disposed closest thereto, and parallel to the orientation of the grates 25, is an air slot 28 via which fresh air can be injected into the combustion chamber for combustion. The air, which is injected downwardly at a slight angle, also serves to guide the introduced fuel over the individual fluidized beds.

Further air inlet openings 29 are also provided in the upper region of those sides of the crosspieces 27 which are remote from the inlet 12. As is the case with the air slot 28, combustion air and transporting air can be injected through the openings 29.

Two hopper-like air-supply shafts 31 are disposed below the fluidized beds 14. The two air-supply shafts 31 are disposed below the first four and last four fluidized beds 14. The walls of the air-supply shafts 31 are beveled and overall have a funnel shape, in order to be able to withdraw downwardly any ash or fine sand which might be produced.

Provided in the walls of the two air-supply shafts 31 are openings 32 via which hot gases can be conveyed from below via a blower 33 through the fluidized beds 14. In the illustrated embodiment, the wall between the two air-supply shafts 31 is in the shape of a roof, so that the blower 33 can be positioned below the roof-like walls 34. The hot gases originate from the combustion chamber 35, and are conveyed in a manner to be described subsequently via the blower 33 and the openings 32 into the air-supply shafts 31, from where they are conveyed through the fluidized beds 14.

The bottom ends of the two air-supply shafts 31 are open, and furthermore open into a common transport channel 36, via which solid particles which fall through can be withdrawn.

Of course, depending upon the prevailing conditions of use, it is readily possible, and perhaps even advantageous, to provide in place of the two air-supply shafts 31 a plurality of such shafts, and in the extreme case one shaft for each fluidized bed. In this way, the air supply of the hot gases for each fluidized bed can be individually controlled. However, it is also possible, by appropriate position-variable guides disposed in the air-supply shaft 31, to control the quantity of hot gas which is guided through a given fluidized bed 14. In the illustrated embodiment, valve flaps, (not illustrated) are also disposed in the openings 32 in oder to be able to vary the quantity of hot gas which is introduced.

Connected directly to the last fluidized bed 14B when viewed in the direction of transport of the fuel is the outlet 13, which is in the shape of an upside down L, with the bottom outlet end 13A opening into the transport channel 36. The outlet 13 is completely lined with refractory material.

The upper part 19 of the furnace extends from the base 18 in a dome-like fashion, with this part also being completely lined with refractory materials. The refractory lining can comprise bricks, injected material, or the like.

Outlet openings 40 through which a portion of the hot gas can exit are provided at the upper end of the dome in a ring-like fashion in the refractory lining. All of the outlet openings 40 open into an annular channel 41 which is guided around the outside of the dome. Aided by another blower 33, the annular channel 41 guides the hot gases into the region of the air-supply shafts 31, from where, as described, the hot gases are conveyed through the fluidized beds 14. The dome can be closed off by a closure cone 42, which can be displaced axially upwardly as a disk. For this purpose, a rod 43 extends centrally from the top of the closure cone 42. The rod 43 is guided on the steel jacket 10 of the furnace in a supported manner, and aids in raising or lowering the cone, as a result of which the respective through opening can be adjusted. In addition, a swirl device can be provided in the dome, so that as a result of the centrifugal forces, the solid material particles are carried toward the outside and are withdrawn via the openings 40, whereas the hot gases, which are conveyed via the opening in the region of the closure cone 42 and the adjoining outlet channel 60, are practically free of contaminants. Disposed on the outside of the dome-like upper part 19 is an emergency flue 47 which can be connected via an appropriate feed line 48 and an (not illustrated) opening in the dome if the hot gas which is generated cannot be completely withdrawn. Known (not illustrated) safety mechanisms assure that the opening to the flue 47 is reliably exposed when needed.

An additional inlet opening for the supply of further additives to the respective fuel can be provided in the furnace. The appropriate opening is preferably disposed in the region of the inlet 12.

The inventive furnace fundamentally operates as follows:

The fuel is filled in the hopper 21 in the region of the inlet 12 and passes from there into the contact area of the compacting screw 22, from where the fuel is transported into the combustion chamber 35. The arrangement of the screw 22 is such that the fuel falls directly upon the first fluidized bed 14A. Hot gas flows from below through this bed, and through the other beds, with the flow velocity being such that the sand bed is kept just below the point of fluidation. Thus, no swirling of the sand with the fuel particles takes place in the sense of a classic fluidized bed; rather, while to the greatest extent possible maintaining its outer shape in the fluidized bed 14, the sand is, so to speak, held "at rest" (static rather than dynamic fluidized bed).

In this connection, it is important that the specific weight of the sand be greater than that of the fuel. This assures that the hot gas which is conveyed through the fluidized bed 14 on the one hand does not swirl the sand bed, yet on the other hand swirls the fuel particles disposed on or above the sand bed, so that these particles can be individually burned. Thus, the sand practically replaces the perforated bottom of a customary fluidized bed, and at the same time provides protection for the valve nozzle bottom.

In order to achieve combustion of the fuel particles, an important condition is that the temperature of the sand and of the hot air which is flowing through be greater than the ignition temperature of the fuel. The fuel is swirled only by the hot gases which flow in from below, and is transported by the combustion air which is flowing through the furnace in the direction of transport of the fuel; this air is introduced in particular in the region of the fuel introduction through the air slot 28 and the crosspieces 27. At the same time, it is possible at this location to have a first control of the combustion temperature in the furnace by operating with varying amounts of excess air.

For a number of reasons, it is desirable to maintain in the furnace a combustion temperature of between 500° and 900° C., preferably between 500° and 800° C. These temperatures are below the temperatures at which $NO_x$ compounds are synthesized, which compounds are undesirable as noxious materials in further combustion and filtering processes.

In addition, the decomposition and melting of salts which are possibly present in the fuel can be prevented, thus contributing to a further reduction of the release of noxious materials into the environment.

The fuel particles are gradually transported in the direction of the outlet 13, especially by the combustion air introduced via the air slot 28, whereby the fuel particles are guided over the various fluidized beds 14, where they respectively receive additional impulse thrusts because air inlet openings 29 are provided in the crosspieces 27 between the fluidized beds 14; via these openings 29, combustion air is also introduced in the transport direction of the fuel.

It is to be understood that hot gas flows from below through each fluidized bed 14, as was described in connection with the fluidized bed 14A which is disposed the closest to the inlet 12. On the one hand, sufficient air passes through in order to swirl the fuel particles, yet on the other hand the sand bed is kept at rest.

In the illustrated embodiment, the hot gases are guided through two air-supply shafts 31, which are disposed below the first four and the last four fluidized beds 14. Disposed between these two air-supply shafts 31 is a blower 33 for controlling the speed of the gas. In addition, however, valve flaps are disposed in the outlet openings 32 within the air-supply shafts 31, so that the groups of fluidized beds can be supplied with different quantities of hot gas and with different gas-flow velocities. Since the fuel becomes increasingly lighter as combustion proceeds, the flow velocity of the hot gas no longer has to be so great through the fluidized beds 14 disposed in the back region of the furnace as it was in the region of those beds disposed about the inlet 12. Together with appropriate control of the supply of hot gas through the openings 32, the supply of combustion air through the air slot 28 and the air inlet openings 29 can also be controlled. The hot gases are withdrawn from the furnace in the upper, dome-like part 19. For this purpose, the outlet openings 40 are provided, through which the hot gases pass into an annular channel 41 which is disposed about the upper part 19. The annular channel 41 is then guided around the outside of the furnace to the blower 33 in the vicinity of the air supply shafts 31. This means that the air which has already been burned once is again supplied from below via the blower 33 through the fluidized beds 14, thus on the one hand being able to avoid heating the gases, and on the other hand, however, the hot gases entering the combustion chamber 35 are burned a second time, so that especially noxious materials which still remain are subjected to a second combustion. This is particularly applicable for carbon monoxide residue in the hot gas, the amount of which can be drastically reduced by repeated combustion.

After the fuel has passed over the fluidized bed 14A to the fluidized bed 14B, and has been gradually completely burned along the way, the remaining ash is subsequently withdrawn downwardly via the outlet opening 13 to the transport channel 36.

Ashes as well as fine sand particles which collect below the fluidized beds 14 slide along the inclined walls of the funnel-shaped air-supply shafts 31, and thus, via the opening provided at the bottom end, also reach the transport channel 36, where they are combined with the ashes which are carried out through the outlet 13.

Excess hot gases are withdrawn via a line 60, and are available for further use, for example for drying or for generating steam.

Disposed on the outer side of the upper part 19 of the combustion furnace is an emergency flue 47, which is connected with the upper part 19 via a feed line 48. In case the hot gases produced can no longer be withdraw, the feed line 48 opens and the hot gases can escape via the emergency flue 47.

In one advantageous embodiment of the invention, there is disposed in the upper free end region of the upper part 19 of the combustion furnace a swirling mechanism via which the dust particles contained in the hot gases are guided outwardly, and can thus be guided for separation directly through the outlet openings 40 in the annular channel 41 and/or through other withdrawal channels below the fluidized beds 14.

Via an annular channel 66 connected with the dome, fresh air and/or used air from the drying can be conveyed into the system.

Thus, with the inventive combustion furnace, the combustion process and the flow-through of the fuel and the ashes can be precisely coordinated from step to step (fluidized bed to fluidized bed).

FIG. 4 schematically again illustrates a furnace unit where the combustion gases are subjected to a further processing in a special manner.

The hot gases withdrawn from the combustion chamber 35 are conveyed via a line 51 to a dryer 50 which is disposed ahead of the inlet 12 of the furnace, and in which the fuel, for example the refuse fraction produced from the refuse treatment, is fed in to a depth of between 30 and 120 mm. In this manner, an additional drying of the material can be achieved, as a result of which especially the lower heating value of the fuel can be increased. While the hot gases at the end of the dryer 50 are then withdrawn and conveyed to a filter unit 54, the predried fuel passes in a described manner via the hopper 21 and the compacting screw 22 into the combustion chamber 35.

To the extent necessary, blowers can be installed in the hot gas line to accelerate the transport.

In addition, a feed-water heater can be interposed in the line between the combustion chamber 35 and the dryer 50. The line 51 can optionally be guided through this heater, thus making possible an additional utilization of energy.

The hot gases conveyed to the filter unit 54 are conveyed through known textile filters, which may be coated with lime in order to enable binding of sulfur. Fresh lime can continuously be supplied from a storage bin 57 for lime which is connected ahead of the filter unit 54.

With the embodiment illustrated in FIG. 4, a line 58 extends from the lime storage bin 57 to the feed hopper 21, so that the fuel is already mixed with lime for subsequent sulfate binding prior to entry of the fuel into the combustion chamber.

Figure 6:
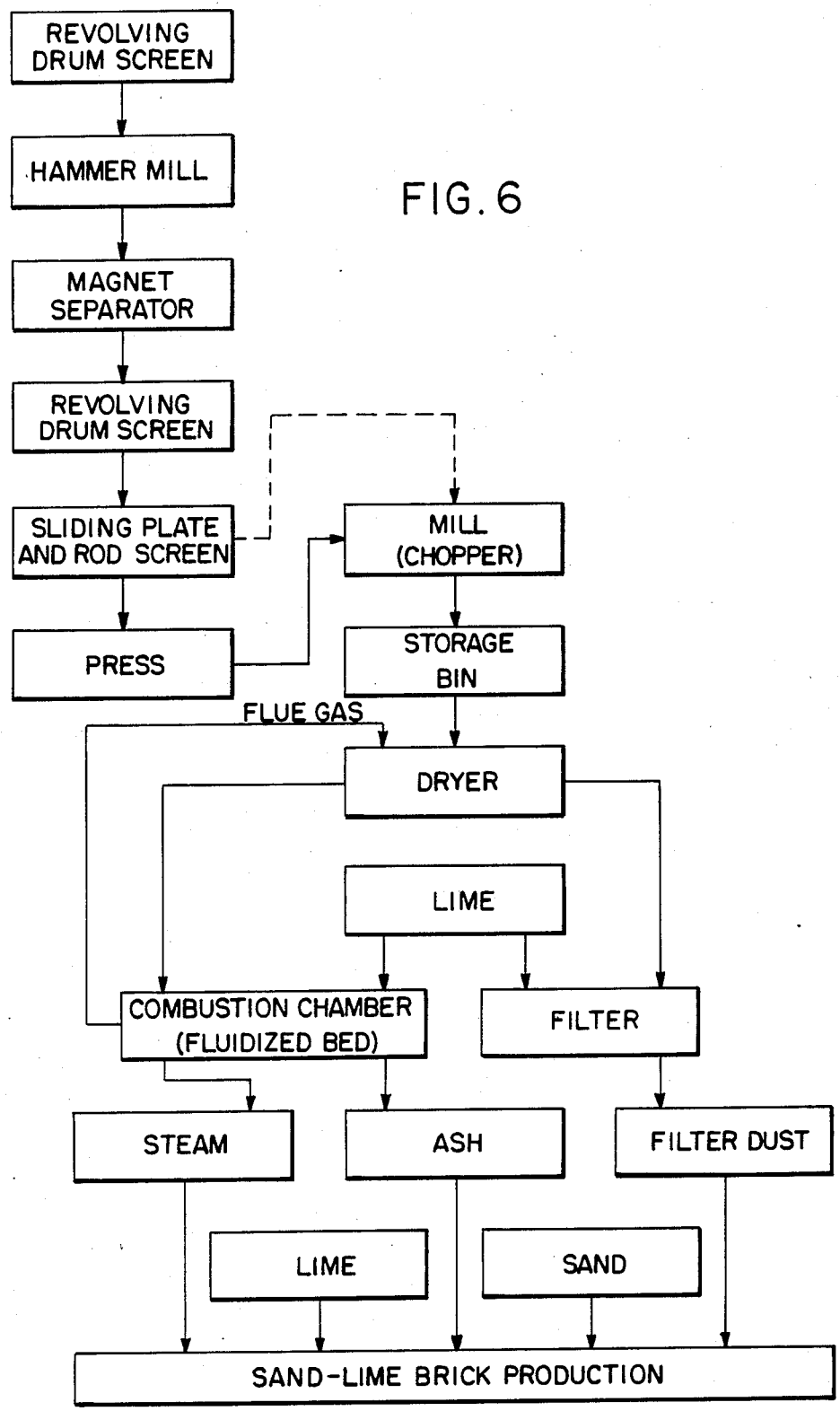

The flow diagram illustrated in FIG. 6 is essentially divided into three parts:
  treatment of household refuse for producing a fuel fraction rich in energy and low in emissions,
  treatment of the fuel ahead of the combustion furnace and prior to subsequent combustion,
  binding of ashes and possible filter dust in the production process of producing sand-lime brick, while at the same time utilizing heat of combustion.

The delivered household refuse and/or industrial refuse similar to household refuse is first subjected to a screening at about 180 mm in a revolving drum screen. Bulky parts greater than 500 mm may previously be removed. The fraction remaining on the revolving drum screen is subsequently conveyed to a hammer mill. In this connection, for the purity of the later-separated fuel, the mechanical exposure of the refuse material in the hammer mill is of critical significance. The selectively determined configuration of the hammer, and the use of special grates in the mill chamber of the hammer mill can bring about that essentially the paper is subjected to a reduction in size. In contrast, the synthetic material conveyed to the hammer mill (for example plastic bags) are not reduced in size, and can be later isolated by screening. The circulating hammers furthermore also effect a rejection of the adhering contaminants, such as dust, so that a material mixture which is essentially free of contaminants is available for the further treatment steps.

The hammer mill has important advantages relative to other size-reduction devices, such as rotary cutters, which form gaps through which material can fall which has not been reduced in size, so that a concentration of the fuel which is to be separated can only be achieved to a limited extent.

The material withdrawn from the hammer mill is subsequently conveyed over a magnet separator in order essentially to remove iron contaminants.

The subsequent screening in the multi-stage screening unit, which pursuant to one advantageous exemplary embodiment of the invention is embodied as a revolving drum screen, is effected at screen widths of about 30 mm and subsequently about 180 mm, in order, with typical household refuse and industrial refuse which is similar to household refuse, on the one hand to achieve an optimum production of fuel, and on the other hand to achieve an as optimum as possible selective recovery of individual refuse constituents, especially paper.

While the material which is smaller than 3 mm is withdrawn and is fed to a composting site or a dump, the fraction between 30 mm and 180 mm, due to the special preceding treatment stages, contains nearly exclusively paper (about 95% by weight), while the amount of synthetic material is only about 5% by weight. Hence, this fraction can be withdrawn and prepared for the production of recycled paper.

In contrast, the fraction greater than 180 mm is essentially a synthetic material-paper mixture, comprising, for example, approximately 30 to 40% by weight synthetic material, and 60 to 70% by weight paper. These two constituents are present in household refuse at approximately 25% by weight (paper) and 7-9% by weight (synthetic material), i.e. by means of the inventive combination of the various treatment steps and the use of the size-reduction and screening units, there is effected to a great extent a concentration of these two components, whereby in particular the amount of synthetic material can be increased by the appropriate use of the free screen surface, in order in this way to increase the heating value of the fuel to values of up to about 20,000 kilojoules/kilogram. As a result, the heating value is greater than, for example, lignite.

The second screening, at a grain size of 30 mm, after the size reduction in the hammer mill, furthermore assures that undesired inert materials are removed, so that the ash portion of the isolated fuel fraction can be kept below 15% by weight. In contrast, with the heretofore known methods values on the order of magnitude of 30% by weight must be accepted. Furthermore, due to the hammer mill in particular contaminants having a high moisture content are repelled, so that a special drying of the fuel can be eliminated. Finally, the repelled fine constituents reduce the salt content of the fuel, which salts, during the combustion process, produce an undesired gas level.

COMMERCIAL UTILIZATION

Due to its particularly good combustion properties, and the conduct of the combustion process, the inventive industrial furnace can be used for all fuels with the described advantages. The fuel fraction produced from refuse pursuant to the inventive method makes it possible, in contrast to fuels produced pursuant to conventional methods, to use them in furnaces without flue gas scrubbers. In contrast, due to their high content of contaminants, fuels produced pursuant to heretofore known methods could be burned only partially in this manner, because they caused high amounts of harmful emissions, and their ashes could only be supplied for further use to a very limited extent.

A further advantage of the inventive method is that after size reduction to a size between 30 and 50 mm, the fuel fraction produced by this method is available without further treatment for the combustion, because the moisture, as a further characteristic of the fuel, is kept relatively low. Generally, the fuel has a moisture content of less than 15% by weight, thus also permitting unlimited storage.

To the extent that the fuel produced pursuant to the previously described method steps is not to be burned in the immediate vicinity of where it was produced, it is possible to compress the separate fuel fractions, preferably prior to the described size-reduction, into balls or special containers which can then readily be easily and economically transported to another location, where they can then be burned.

As already described, the preparation of the fuel prior to the combustion furnace is initially effected in a chopper to reduce the size of the material to between 30 and 50 mm. The thus size-reduced material can then, if necessary, be temporarily stored in a bin.

Thereafter, the material is immediately available for introduction into the combustion furnace, or it can be preliminarily dried in a drying drum by appropriately conveying the hot exhaust gases of the combustion furnace using the heat content thereof.

As can be further seen in the flow diagram of FIG. 6, hot steam withdrawn from the furnace, and/or the ashes withdrawn from the furnace, and/or the filter dust withdrawn from the filter unit, can be further used, for example to bind in a mass for the production of sand-lime brick, or as heating medium during the hardening process.

It is thus inventively possible to bring about a particularly environmentally favorable method for eliminating refuse accompanied by the simultaneous use of the products produced during combustion. The features of the subject matter of these papers as disclosed in the preceding specification, the claims, the abstract, and the drawings, are important in their various embodiments either individually or in any combination for implementing the invention.

What we claim is:

1. An industrial furnace, having a combustion chamber, for the combustion of solid, liquid, pasty or gaseous fuel, said furnace also having a fuel inlet, and gas and ash outlet means, and comprising:
   at least two fluidized beds through which hot gas flows from below, and over which said fuel passes; in the direction of transport of fuel in said combustion chamber, said fluidized beds of inert material being disposed one after the other in inherently stable condition just below point of fluidation so that mixing of fuel and bed material is avoided whereby the fuel is conveyed by introduced combustion air over the fluidized beds, said fluidized beds being separated from one another, and being offset in height so as to be stepped so that an average combustion temperature is set in a range between 500°–800° C., said fluidized beds being filled with material having a higher specific weight than does said fuel.

2. A furnace according to claim 1, in which said fluidized beds are stepped in a downwardly inclined fashion in the direction of transport of said fuel in said combustion chamber.

3. A furnace according to claim 1, in which said fluidized beds are filled with material which is selected from the group consisting of sand and ceramic material.

4. A furnace according to claim 1, in which said fluidized beds are respectively provided with a valve nozzle bottom.

5. A furnace according to claim 1, in which said fluidized beds comprise gas-permeable ceramic material.

6. A furnace according to claim 1, which includes blower means for introducing said hot gas which flows through said fluidized beds, with the transport velocity of said hot gas being regulated such that said fluidized beds essentially have a stable shape.

7. A furnace according to claim 1, which includes air-supply shaft means for supplying said hot gas to said fluidized beds, with said shaft means being provided with means for controlling the quantity of hot gas flowing therethrough.

8. A furnace according to claim 1, which includes delivery means disposed in said furnace in such a way that they have a general slope which corresponds to the stepped configuration of said fluidized beds; said delivery means serve to introduce a directed flow of combustion air into said combustion chamber for conveying fuel over said fluidized beds to said gas and ash outlet means.

9. A furnace according to claim 8, in which said delivery means are disposed in the region of that fluidized bed disposed the closest to said fuel inlet, and in the region between said fluidized beds.

10. A furnace according to claim 1, which includes an upper part, infinitely variable outlet openings in said upper part, and a conduit which leads to air-supply shaft means disposed below said fluidized beds for supplying said hot gas thereto, with a portion of exhaust gases from said combustion chamber being returned via said outlet openings and said conduit to said air-supply shaft means.

11. A furnace according to claim 1, which includes a swirl device in the region of said outlet openings.

12. A furnace according to claim 1, which includes a filter unit for the remaining portion of said exhaust gases.

* * * * *